G., P. & J. GAIRE.
MACHINE FOR BEVELING ROUND GLASS.
APPLICATION FILED MAY 19, 1908.

915,284.

Patented Mar. 16, 1909.
3 SHEETS—SHEET 1.

G., P. & J. GAIRE.
MACHINE FOR BEVELING ROUND GLASS.
APPLICATION FILED MAY 19, 1908.

915,284.

Patented Mar. 16, 1909.
3 SHEETS—SHEET 2.

Witnesses
C. E. Smith
S. E. Dodge

Inventors
G. Gaire,
P. Gaire, and
J. Gaire,

By Beeler & Cobb
Attorneys

G., P. & J. GAIRE.
MACHINE FOR BEVELING ROUND GLASS.
APPLICATION FILED MAY 19, 1908.
915,284.
Patented Mar. 16, 1909.
3 SHEETS—SHEET 3.
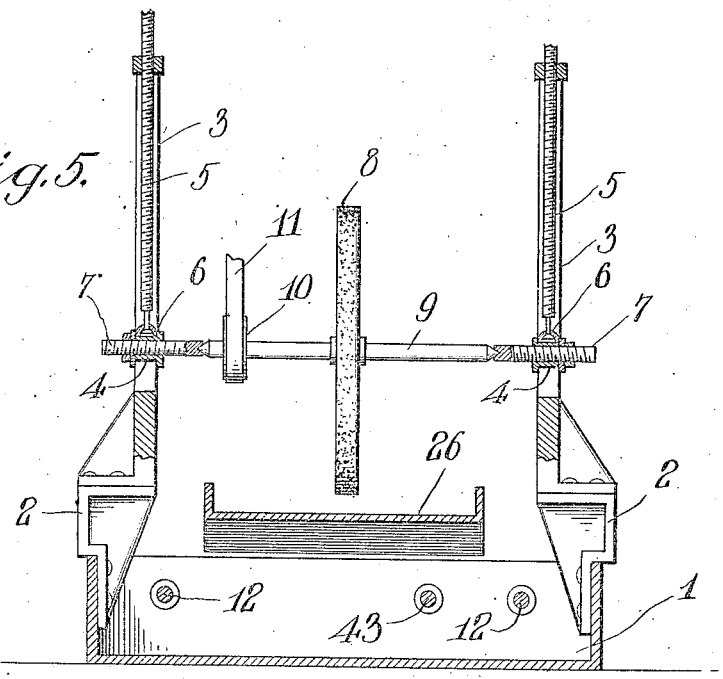
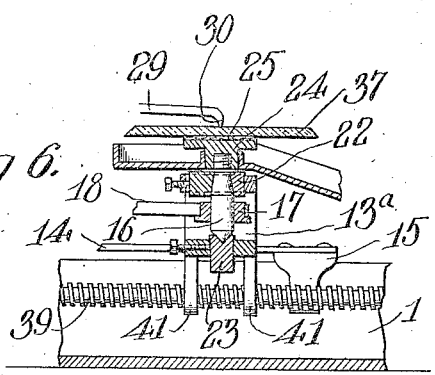
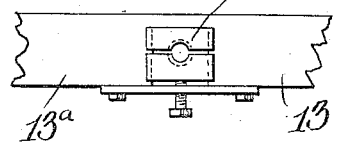
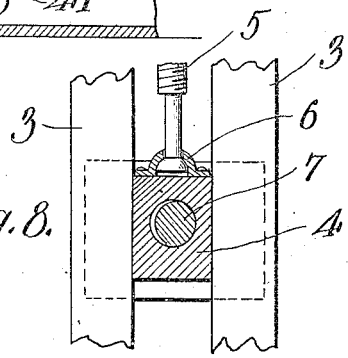
Witnesses
C. E. Smith.
S. E. Dodge.
Inventors
G. Gaire,
P. Gaire, and
J. Gaire,
By Beeler & Cobb
Attorneys

UNITED STATES PATENT OFFICE.

GUSTAVE GAIRE, PAUL GAIRE, AND JOSEPH GAIRE, OF PATERSON, NEW JERSEY.

MACHINE FOR BEVELING ROUND GLASS.

No. 915,284.  Specification of Letters Patent.  Patented March 16, 1909.

Application filed May 19, 1908. Serial No. 433,721.

*To all whom it may concern:*

Be it known that we, GUSTAVE GAIRE, PAUL GAIRE, and JOSEPH GAIRE, citizens of France, residing at Paterson, in the county of Passaic and State of New Jersey, have invented certain new and useful Improvements in Machines for Beveling Round Glass, of which the following is a specification.
This invention embodies improvements in machines designed particularly for the purpose of grinding glass.

The object of the invention is to provide a machine of the above type which is constructed for the purpose of beveling round glass, or the like, and in the practical embodiment of the invention it is aimed to secure a structure which is simple, comparatively speaking, and which includes a compact arrangement of parts adapted to be adjusted to accommodate work of different sizes and possessing other advantages under actual conditions of service.

For a full understanding of the invention, reference is to be had to the following detail description and to the accompanying drawings, in which—

Figure 1:
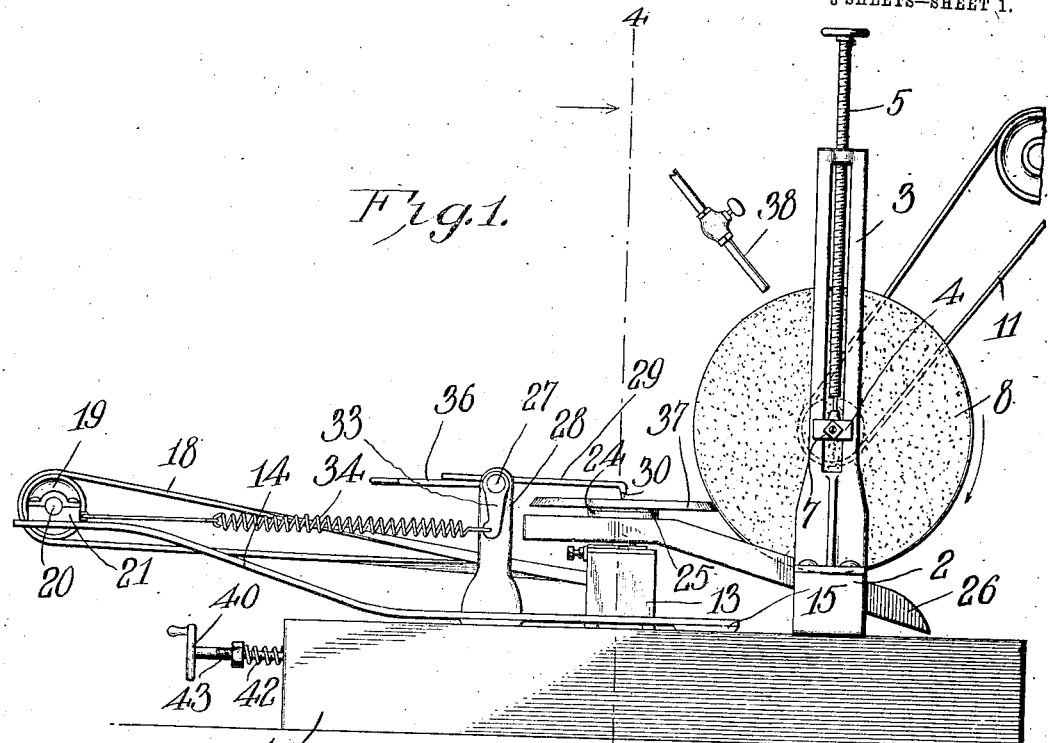
Figure 2:
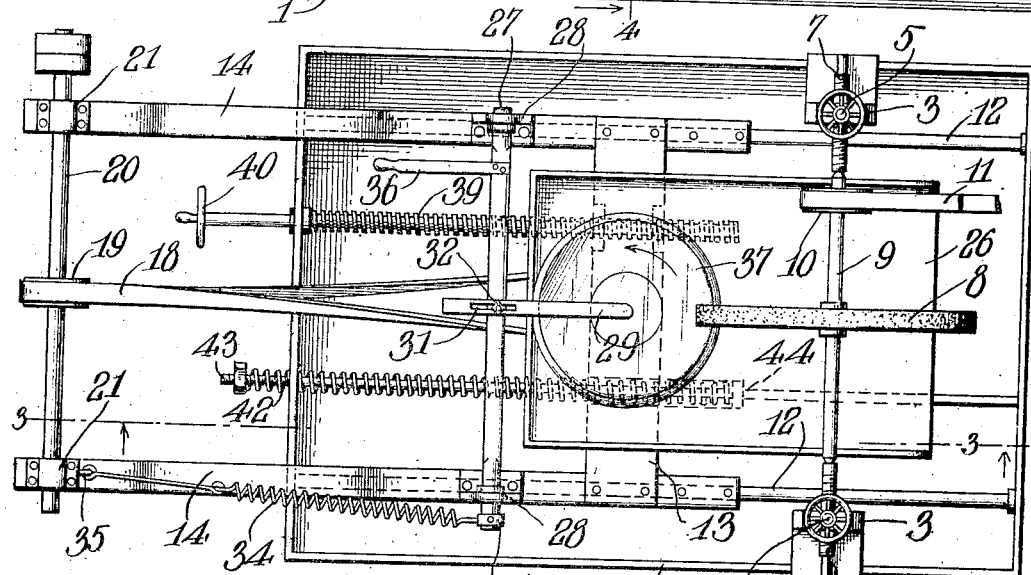
Figure 3:
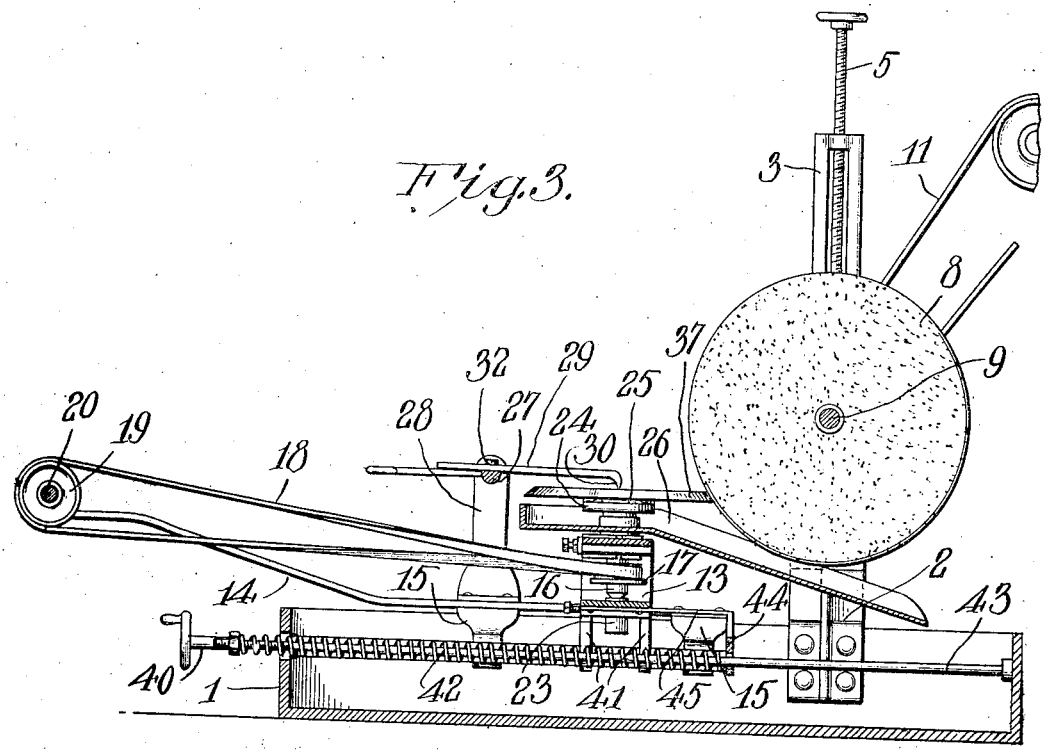
Figure 4:
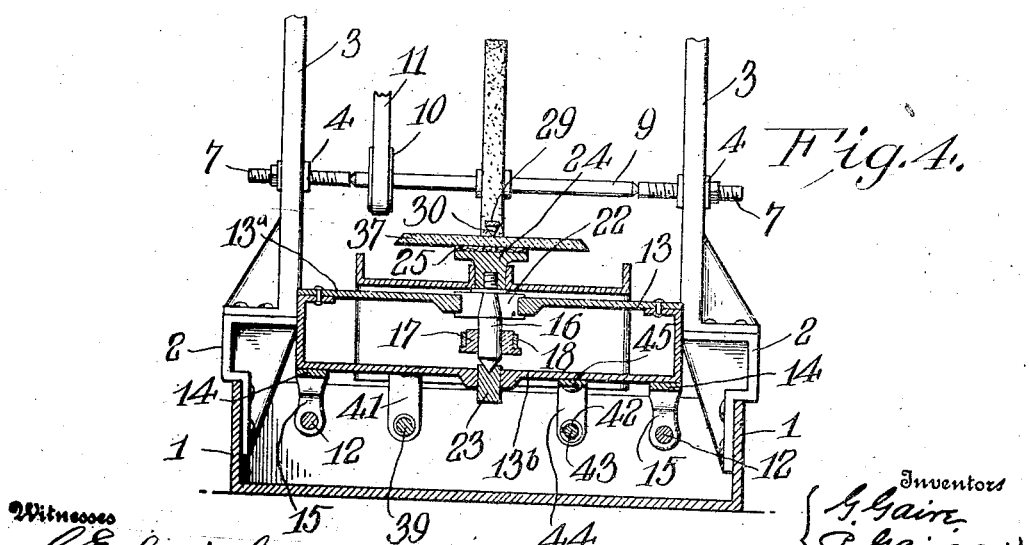

Figure 1 is a side elevation of a machine embodying the essential features of the invention; Fig. 2 is a top plan view; Fig. 3 is a vertical longitudinal sectional view; Fig. 4 is a transverse sectional view taken about on the line 4—4 of Fig. 1 and looking in the direction of the arrow; Fig. 5 is a transverse section bringing out more clearly the mounting of the grinding wheel; Fig. 6 is a detail sectional view, partially broken away, showing clearly the work supporting and clamping means and the operating connections for rotating the work support; Fig. 7 is a fragmentary view of the upper portion of the frame of the carriage showing members of the sectional bearing carried thereby; Fig. 8 is a detail view partly in section, bringing out more clearly the mounting of the blocks adjustably mounted on the vertical standards and which support the grinding wheel shaft.

Throughout the following description and on the several figures of the drawings, similar parts are referred to by like reference characters.

Specifically describing the invention the numeral 1 designates the base of the machine upon which are mounted the various parts of the mechanisms employed for the purposes of the invention. The base 1 is preferably of somewhat rectangular form though not necessarily so, and carried by brackets 2 secured to opposite sides of the base are vertical standards 3 which are attached at the lower ends to the brackets 2 by suitable fastenings. In each of the standards 3 is mounted a block 4 adjustable by means of a screw 5, the lower end of which has a swivel connection 6 with the block, the screw 5 having a threaded connection with the upper end portion of the standard upon which it is mounted. Each block 4 carries a horizontal threaded member 7 which passes through the block and has threaded connection with the latter permitting suitable adjustment. The grinding wheel is indicated at 8 and is carried by a shaft 9 upon which is also keyed or otherwise secured a pulley 10 connected with a drive belt 11. The opposite ends of the shaft 9 are pointed and received in bearings in the adjacent or inner ends of the adjustable threaded members 7, and it will be apparent that the shaft 9 is readily displaceable and mounted in adjustable bearings.

Extending longitudinally of the base 1 of the machine are a pair of guide rods 12 which support a carriage 13 mounted for movement longitudinally of the base toward and from the grinding wheel 8. The carriage 13 consists of a rectangular frame secured at its opposite ends to longitudinal bars 14, said bars being carried by downwardly projecting arms 15 attached to the under sides thereof; said arms being formed with openings through which the members 12 pass. Two of the members 15 are secured to each bar 14 and arranged adjacent to a side of the base, the arrangement of the members 15 permitting of mere sliding movement thereof along the guide rods 12 when the carriage 13 is being moved lengthwise of the machine. The frame of the carriage 13 consists of upper and lower plates 13ª and 13ᵇ respectively, and mounted between said plates is a short vertical shaft 16 having a pulley 17 attached thereto intermediate of its ends, a drive belt 18 passing about said pulley. The drive belt 18 also passes around a drive pulley 19 mounted about a shaft 20 supported in suitable bearings 21 on the outer or free ends of the bearings 14, the latter inclining upwardly at such ends.

The shaft 16 is supported at its upper portion in a sectional bearing 22 carried by the upper plate 13ª of the frame of the carriage 13, the said bearing being shown more clearly in Fig. 7 of the drawings. The lower end of the shaft 16 is also mounted on an adjustable member 23 provided with a suitable bearing for said shaft. At its upper end portion the shaft 16 is threaded so as to readily connect with the work support or head 24 which is formed with a threaded recess adapted to receive the upper end of the shaft 16. The work support 24 is thus securely connected with the shaft 16 and is rotatable with said shaft when the machine is in operation, the shaft being driven by the shaft 18 from the pulley 19. On its upper side the work support 24, which virtually comprises the detachable head on the shaft 16, is provided with a covering 25 of some soft material which is adapted to frictionally engage the work or glass but will prevent scratching or injury to the same in an obvious manner, when the work is clamped or held against the head or support 24. Between the head or work support 24 and a shoulder near the upper end of the shaft 16 is supported a pan 26 which extends over those parts of the machine adjacent to and beneath the grinding wheel 8 and prevents the water or other foreign matter which is splashed or thrown outwardly in the grinding operation from injuring the parts aforesaid. The pan 26 inclines downwardly at one end so as to extend beneath the grinding wheel 8 as shown most clearly in the drawings.

In order to firmly hold the work in place as it is operated upon by the grinding wheel 8 it is contemplated to provide peculiar clamping means. Said means consists of a shaft 27 arranged transversely of the machine and mounted in bearings at the upper portions of vertical brackets 28 carried by the bars 13. Secured to the shaft 27 is a clamping member or arm 29 one end of which is formed with a downwardly extending point or projection 30 adapted to engage the glass at a point substantially in alinement with the axis of rotation of the work support 24. The member 29 is adjustable by means of a slot 31 in its length through which passes a fastening 32 securing the member to the shaft 27. An arm 33 extends from one end of the shaft 27 and is connected by a spring 34 with an attaching member 35 connected with the upper portion of one of the bars 14. The normal tension of the spring 34 is such as to cause the projection 30 to firmly engage and hold the piece of glass or other work upon the work support 24, and by reason of the form of the clamping device 29 it will be apparent that the member 30 thereof virtually performs the function of a pivot bearing permitting of proper rotation of the glass carried by the support 24 and arranged so that its edge will be ground or beveled properly by the wheel 18 coming into contact therewith. A handle 36 is connected with the shaft 27 and by pressing downwardly upon the handle the clamping arm 29 may be raised from the work, which is indicated at 37, when it is desired to remove the work or position the glass properly with reference to the grinding wheel. A suitable pipe is used to convey water to the grinding wheel 8, as shown in Fig. 1.

In order to facilitate the adjustment of the carriage 13 in moving the work toward or from the grinding wheel 8 it is contemplated to provide a feed screw 39 which is swivelly connected with an end of the base 1 of the machine and is provided at its outer end with a handle 40. The screw 39 passes through a pendent arm or arms 41 carried by the lower plate 13$^b$ of the carriage 13, and by turning the screw 39 it will be apparent that the carriage may be readily moved longitudinally of the base 1 and its position suitably adjusted with reference to the grinding wheel 8. The spring 42 mounted upon the rod 43 suitably carried by the base of the frame bears at one end against the downwardly projecting extension 44 of a plate 45 secured to the lower portion of the carriage 13, and this spring tends to normally force the carriage in the direction of the grinding wheel 8.

The operation of the machine is comparatively simple. The grinding wheel 8 is adjustable vertically while the carriage 13 which supports the glass while it is being operated upon is adjustable longitudinally of the base, the arrangement of the aforesaid parts being such as to permit of beveling the glass at a different angle according to the desire of the workman. While the grinding wheel 8 rotates about a horizontal axis the glass is rotated about a vertical axis while it is being operated upon by the grinding wheel and is firmly held in place during such operation by a peculiar clamping and supporting means hereinbefore described.

Having thus described the invention, what is claimed as new, is:

1. In a glass beveling machine, the combination with grinding mechanism, of a work holder, means for moving the work holder relative to the grinding mechanism, and a work clamping device coöperating with said work holder and comprising a shaft, an arm connected with said shaft and having a work engaging member, and spring means connected with the shaft for holding the work engaging member of said arm in engagement with the work.

2. In a glass beveling machine, the combination of grinding mechanism, a carriage movable toward and from the grinding mechanism, a work holder mounted on said carriage, brackets mounted adjacent to the carriage, a shaft carried by said brackets, a work clamping arm adjustably connected with said shaft and having a work engaging member for coöperation with the work holder, and a spring connected with said shaft and normally tending to hold the work clamping member in engagement with the work.

3. In a glass beveling machine, the combination with a base, of grinding mechanism mounted thereon, guides carried by said base, a carriage slidable on said guides toward and from the grinding mechanism, said carriage consisting of a rectangular frame and longitudinal supporting bars, a shaft mounted on the outer ends of said supporting bars, a drive pulley carried by said shaft, a short vertical shaft mounted in the rectangular frame of the carriage, a vertically adjustable bearing supporting the lower end of said shaft, the upper end of the said short shaft projecting above the upper side of the carriage frame, a work holder detachably secured to the upper end of the short shaft, a pulley carried by the short shaft between the upper and lower sides of the carriage, a belt connecting the last mentioned pulley with the drive pulley aforesaid, a pan supported by the work holder and short shaft and arranged beneath said work holder, an adjusting screw connected with the carriage, a spring normally tending to force the carriage toward the grinding mechanism, and work clamping means coöperating with the work holder.

In testimony whereof we affix our signatures in presence of two witnesses.

GUSTAVE GAIRE.
PAUL GAIRE.
JOSEPH GAIRE.

Witnesses:
WILLIAM B. MORRISON,
HARRIS J. WESTERHOFF.